(12) United States Patent
Kondo (10) Patent No.: US 6,895,451 B2
(45) Date of Patent: May 17, 2005

(54) COMPOSITE DEVICE SYSTEM (75) Inventor: Katsuyoshi Kondo, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/392,923

(22) Filed: Mar. 21, 2003

(65) Prior Publication Data

US 2003/0197888 A1 Oct. 23, 2003

(30) Foreign Application Priority Data

Apr. 18, 2002 (JP) ........................................ 2002-116089

(51) Int. Cl.$^7$ .............................................. G06F 13/00
(52) U.S. Cl. ........................................ 710/19; 719/321
(58) Field of Search ................................ 709/312–321; 710/15–19; 719/321, 312–320

(56) References Cited

U.S. PATENT DOCUMENTS 6,073,253 A * 6/2000 Nordstrom et al. ........... 714/25
6,084,685 A * 7/2000 Mori .......................... 358/1.14
6,216,176 B1   4/2001 Kadota
6,216,196 B1 * 4/2001 Elwell et al. ................ 710/240
6,226,096 B1 * 5/2001 Ouchi ........................ 358/1.14
6,339,477 B2 * 1/2002 Mori .......................... 358/1.14

FOREIGN PATENT DOCUMENTS

JP          2000-231458          8/2000

OTHER PUBLICATIONS

Chinese Office Action mailed Aug. 6, 2004 (w/out English translation).

* cited by examiner

Primary Examiner—Christopher B. Shin
(74) Attorney, Agent, or Firm—Nixon & Vanderhye P.C.

(57) ABSTRACT

A composite device system comprising a host 10 connected to a composite device 20 including plural devices and controlling said composite device, said host comprising plural drive units 11, 12 each corresponding to said devices included in the composite device 20 and controlling said devices, respectively, said drive units 11, 12 capable of recognizing via other drive units the status of other devices controlled by other drive units.

5 Claims, 7 Drawing Sheets

COMPOSITE DEVICE SYSTEM

FIELD OF THE INVENTION

The present invention relates to a composite device system capable of controlling a composite device having various functions.

DESCRIPTION OF THE RELATED ART

In a composite device where various peripheral devices such as a printer, a scanner, a facsimile and a digital camera are mutually connected, plural jobs are sometimes simultaneously demanded to a single device. In such a case, competition of accesses to the device occurs, by which the operation of the composite device becomes unstable. Therefore, in order to prevent competition of accesses to the device, a system is required to control the plurality of accesses.

Japanese Patent Laid-Open No. 2000-231458 discloses a method and apparatus for organizing accesses by providing a controller in the composite device and controlling the operation of other devices disposed in the composite device by the controller. By the application of a USB (universal serial bus) composite technique, it becomes possible to set up a plurality of logical channels. Therefore, by connecting each device constituting the composite device to each logical channel, the devices can each be controlled without causing competition of accesses.

However, according to the above-mentioned publication or the USB composite technique, the operations of the devices are controlled by a control device or a USB hub disposed in the composite device system, according to which complex control of the composite device is performed. The composite device is controlled by resources such as ASIC and ROM, so along with the complication of the control performed by the composite device, a great amount of resource is consumed. As a result, the cost of the composite device is increased.

SUMMARY OF THE INVENTION

The present invention aims at solving the problems of the prior art mentioned above by providing a composite device system that is capable of avoiding competition of accesses between various devices without causing increase of costs.

In order to solve the problem, the present invention provides a composite device system equipped with a host connected to a composite device including plural devices for controlling said composite device, said host having a plurality of drive units corresponding to each device included in the composite device for controlling each device, said drive units capable of recognizing via other drive units the status of other devices controlled by other drive units.

Moreover, according to the present composite device system mentioned above, each drive unit informs the other drive units of a command being input thereto, and recognizes the status of a device whose operation is demanded by the command.

Furthermore, according to the above-mentioned present composite device system, the recognition by the drive unit of the status of other devices is performed at every predetermined time, the control of another device by another drive unit is performed at predetermined time intervals while the control of other devices are stopped, and said drive unit confirms that the control of devices by other drive units are stopped before communicating with the composite device.

The composite device system of the present invention characterizes in that the period of time that the control of other devices by other drive units is stopped is longer than the interval in which the drive unit recognizes the status of other devices at every predetermined time.

DETAILED DESCRIPTION OF THE PREFERRED EMBODIMENTS

FIGS. 1 through 4 are referred to in explaining a preferred embodiment of the composite device system according to the present invention. According to the present embodiment, a composite device comprising a printer function and a scanner function is taken as an example.

Figure 1:
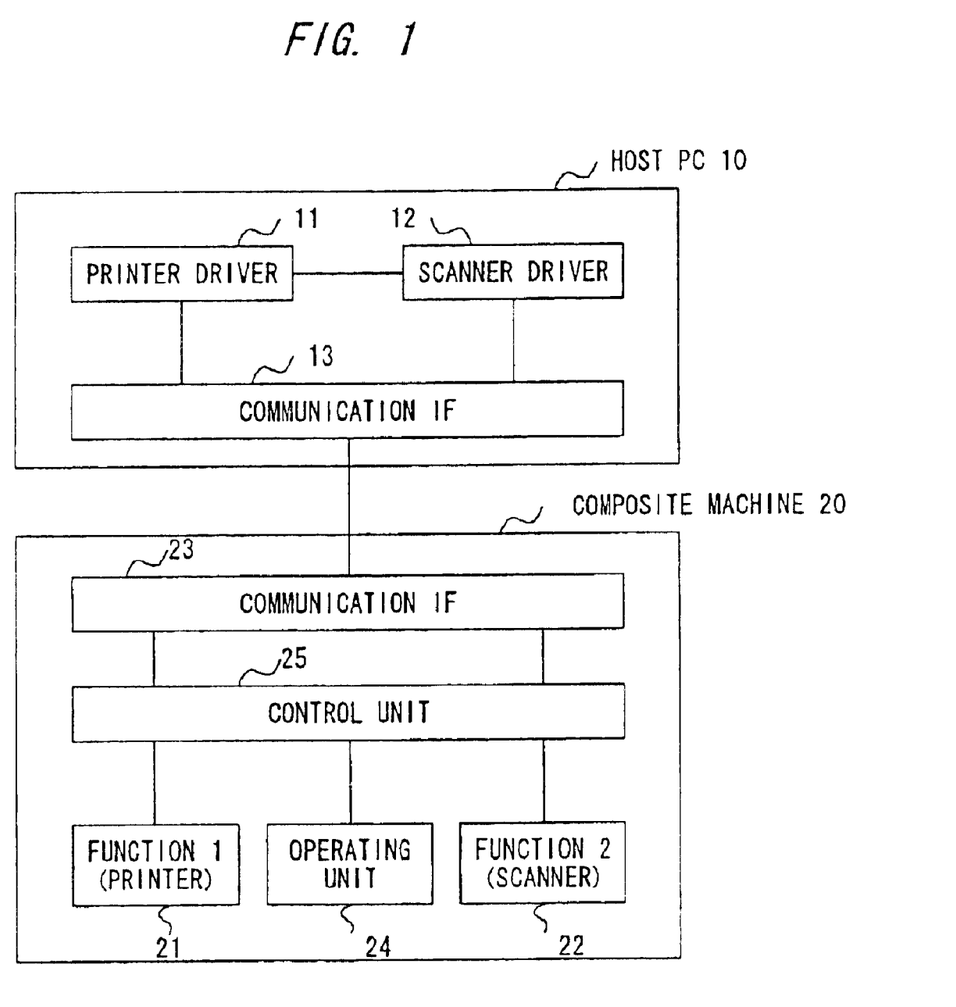
FIG. 1 is a block diagram illustrating the outline of the configuration of the composite device system according to the present invention.

As shown in FIG. 1, the composite device system 1 according to the present embodiment comprises a host PC (personal computer) 10 functioning as the host, and a composite machine 20 which is a composite device equipped with plural device functions. The host PC 10 and the composite machine 20 are mutually connected via a communication IF (interface) 13 and a communication IF 23.

The host PC 10 comprises a printer driver 11 and a scanner driver 12 as driving units, and a communication IF 13, which are mutually connected. The printer driver 11 drives and controls a printer 21 of the composite machine 20. The scanner driver 12 drives and controls a scanner 22 of the composite machine 20. The communication IF 13 transmits the command from the printer driver 11 and scanner driver 12 to the composite machine 20, and receives the command transmitted from the composite machine 20.

The composite machine 20 comprises a printer 21 and a scanner 22 as devices, a communication IF 23, an operating unit 24, and a control unit 25. The printer 21 performs a print job based on the command for a print job. The scanner 22 performs a scan operation based on the command for a scanner job (hereinafter called command for job processing). The communication IF 23 transmits a command from the control unit 25 to the host PC 10, and receives the command transmitted from the host PC 10. The operating unit 24 provides operation directions to the printer 21 and scanner 22. The control unit 25 controls the operations of the printer 21, the scanner 22, the communication IF 23, and the operating unit 24.

The above-mentioned command contains the information required to execute the job processing, such as data for the printer, data for the scanner and data for the control unit. Based on the information contained in the command, the composite device system 1 executes the given process.

If a job processing is demanded to a host PC 10 in the composite device system 1 having the above configuration, the job processing is performed as mentioned hereafter.

When the command for a job processing is input to the host PC 10, the command is recognized either by the printer driver 11 or by the scanner driver 12. Next, the printer driver 11 or the scanner driver 12 recognizes whether or not the printer 21 or the scanner 22 of the composite machine 20 is active or not.

When the printer 21 or the scanner 22 for executing the job processing is not active, the command demanding job processing output from the printer driver 11 or the scanner driver 12 is transmitted via the communication IF 13 and communication IF 23 to the composite machine 20. Based on the received signal, the control unit 25 of the composite machine 20 controls the printer 21 or the scanner 22 to execute the desired job processing.

On the other hand, when the printer 11 or the scanner 22 that is required to execute the job processing is at an active state, a competition of accesses occurs, so an exclusion processing is executed. In other words, while the printer 21 or the scanner 22 is active, the command demanding the job processing is not transmitted from the host PC 10 to the composite machine 20.

The command that has not been transmitted is either cancelled or put on hold (enters a standby state). When the command is cancelled, the job processing will not be executed. On the other hand, when the command enters a standby state, after the operation of the printer 21 or the scanner 22 has been either completed or suspended, the job processing will be executed.

Now, an example assuming that the above job processing is a print job processing will be explained in detail with reference to FIGS. 2 and 3.

Figure 2:
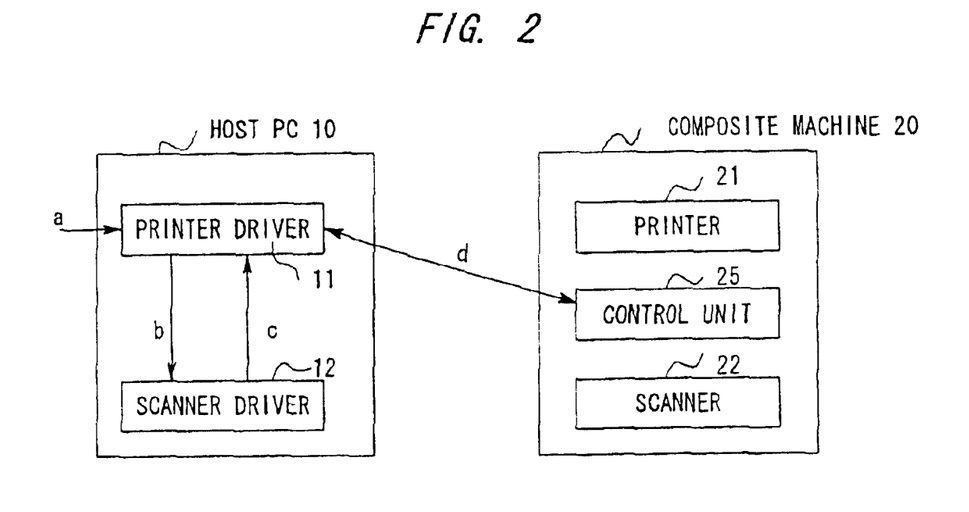
FIG. 2 is a first part of the chart illustrating the process flow according to which a command for a scan job process is input to a printer driver.

First, as shown in FIG. 2, an example is explained in which a command for a print job processing is input to the printer driver 11 of the host PC 10 (path a).

When the command for a print job processing is input to the printer driver 11 (path a), the input command is recognized by the printer driver 11. Next, a confirmation is output to the scanner driver 12 to confirm whether or not the scanner driver 12 is at an active state (path b). The scanner driver 12 confirms that it is not active, and notifies its status to the printer driver 11 (path c). Then, the printer driver 11 transmits the print job processing command to the control unit 25 of the composite machine 20 (path d). As a result, the printer 21 of the composite machine 20 executes the print job processing.

Figure 3:
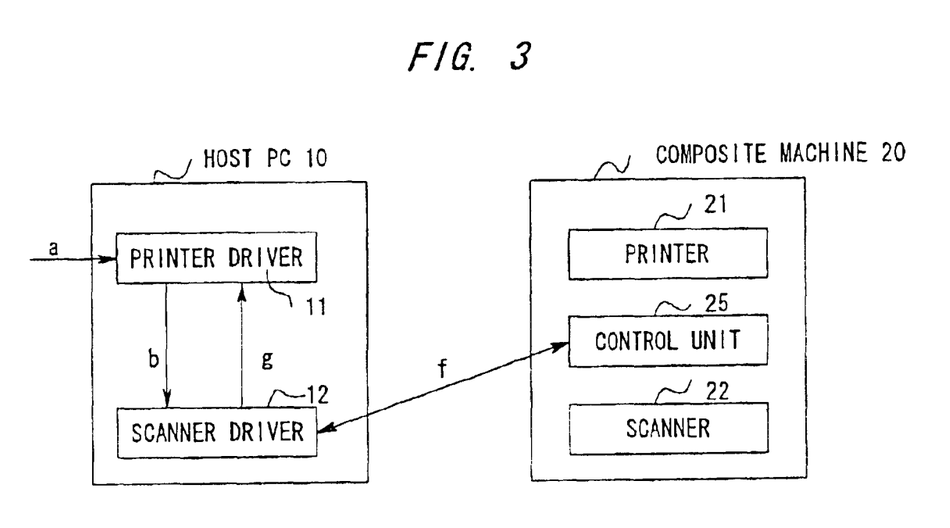
FIG. 3 is a second part of the chart illustrating the process flow according to which a command for a scan job process is input to a printer driver.

Further, as illustrated in FIG. 3, if the command for a print job processing is input to the printer driver 11 of the host PC 10 (path a) when the scanner driver 12 is active (path f), the input command is recognized by the printer driver 11. Next, a confirmation is output to the scanner driver 12 to confirm whether or not the scanner driver 12 is active (path b). The scanner driver 12 confirms that it is active (path f), and notifies the printer driver 11 (path g). Since the scanner driver 12 is active, the command for a print job processing will not be transmitted from the host PC 10 to the composite machine 20.

As a result, when the command that has not been transmitted is cancelled, the print job processing will not be executed, and when the command is put on hold, the print job processing will be executed when a predetermined time has passed. In other words, the host PC 10 comprises a function to either cancel the command or put the command on hold when a job processing command is input when another job process is being executed.

Further, the transmission of the command from the host PC 10 to the composite machine 20 can be performed either via the printer driver 11 or via the scanner driver 12.

Figure 4:
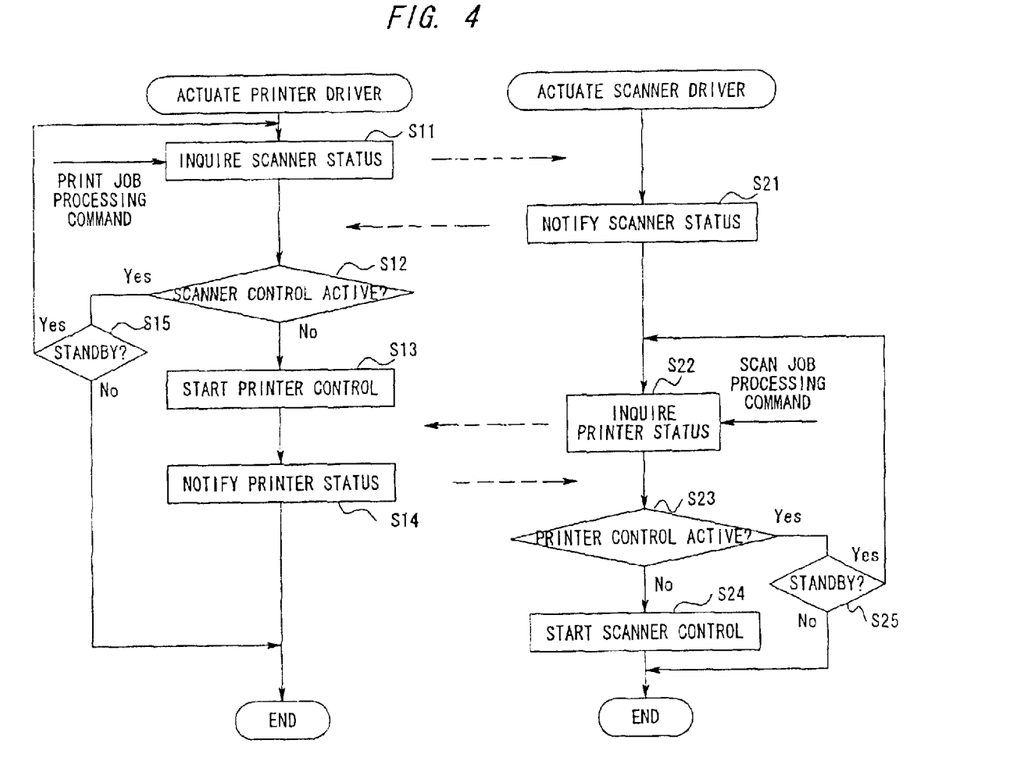
FIG. 4 is an explanatory view showing the process flow when there is a competition between accesses.

The above-mentioned job processing will now be explained with reference to the flowchart of FIG. 4. The processing illustrated in the flowchart of FIG. 4 is performed only when a competition between accesses exists, and will not be performed when no competition between accesses exist.

The printer driver 11 and the scanner driver 12 are actuated. When the command for a print job processing is input to the printer driver 11, the printer driver 11 inquires the status of the scanner 22 to the scanner driver 12 (step S11). Upon receiving the inquiry, the scanner driver 12 sends out a notice to the printer driver 11 reporting whether the scanner 22 is active or not (step S21).

The printer driver 11 determines whether the scanner is active or not based on the notice received from the scanner driver 12 (step S12). When it is reported that the scanner 22 is active, the printer driver 11 determines whether the command for a print job processing should be put on hold or not without notifying the printer 21 (step S15) When it is determined in step S15 that the printer driver 11 should be put on hold, the procedure advances to step S11 again after a predetermined time has passed. On the other hand, if it is determined in step S15 that the printer driver 11 should not be put on hold, the command for the print job processing is cancelled and the procedure is terminated.

On the other hand, when the printer driver 11 receives a notice from the scanner driver 12 notifying that the scanner 22 is not active in step S12, the control of the printer is started, and the command for the print job processing is transmitted from the printer driver 11 to the composite machine 20, based on which the print job processing is executed by the printer 21 and the scanner 22 (step S13).

When a command for a scan job processing is input to the scanner driver, the scanner driver 12 inquires the status of the printer to the printer driver 11 (step S22). Then, the printer driver 11 reports whether the printer 21 is active or not to the scanner driver 12.

When the scanner driver 12 receives a report on the operation status of the printer 23 from the printer driver 11, the scanner driver determines whether or not the printer 23 is active (step S23).

When it is notified in step S23 that the printer driver 11 is active, the scanner driver 12 does not notify the job processing command to the scanner 22, and determines whether or not to be put on hold (step S25). When it is determined in step S25 that the scanner driver 12 should be put on hold, the procedure advances to step S22 again after a predetermined time has passed. On the other hand, if it is determined in step S25 that the scanner driver 12 should not be put on hold, the job processing command is cancelled and the procedure is terminated.

On the other hand, when the scanner driver 12 is notified from the printer driver 11 in step S23 that the printer 21 is not active, the command for job processing is transmitted from the scanner driver 12 to the composite machine 20, based on which the control of the scanner is started. In step S24, the scan job processing is executed by the scanner 22.

On the other hand, when a job processing is demanded for the composite machine 20 in the composite device system 1 having the above-explained configuration, the job processing is performed as follows.

As shown in FIG. 1, when the command for a job processing is input through the operating unit 24 of the composite machine 20, the command is output from the operating unit 24 to the control unit 25.

The control unit 25 recognizes whether the printer 21 or the scanner 22 of the composite machine 20 is active or not, and if they are active, the following process is executed, and if they are not active, the following process is executed after communicating with the host.

At first, a job processing command is transmitted from the composite machine 20 to the host PC 10 via the communication IF 23 and communication IF 13. Next, the host PC 10 recognizes the command being received by the printer driver 11 or the scanner driver 12, and temporarily stores this command. Then, the printer driver 11 or the scanner driver 12 confirms the status of the printer 21 or the scanner 22 of the composite machine 20. Based on the result of confirmation, the job processing based on the stored command is executed, either after the operation of the active printer 21 or scanner 22 is completed or after the operation of the active printer 21 or scanner 22 is suspended.

Figure 5:
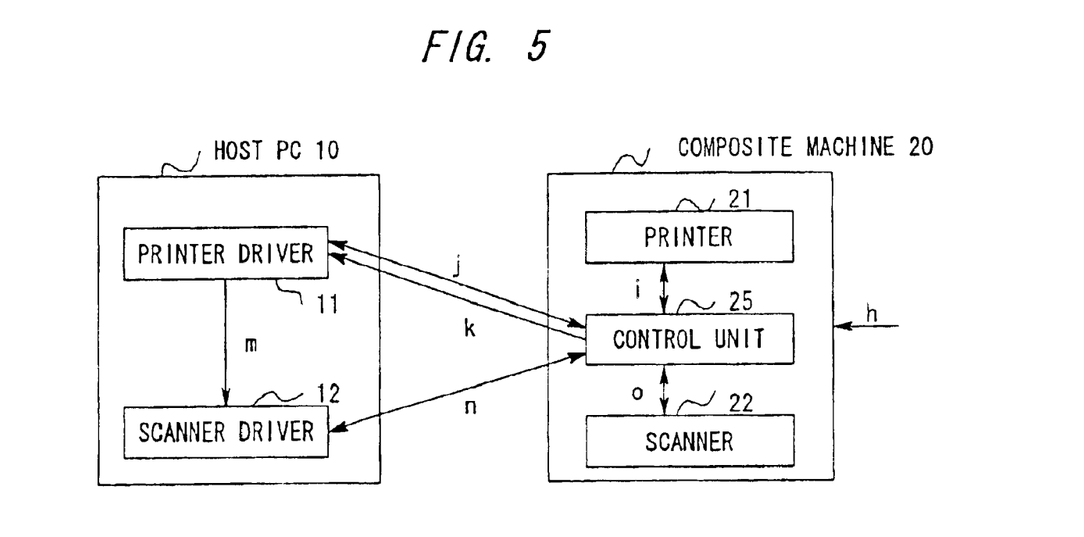
FIG. 5 is an explanatory view showing the process flow according to which a command for a scan job processing is input to the control unit of the composite device.

The above-mentioned job processing will now be explained in detail with reference to FIG. 5. While the printer 21 of the composite machine 20 is active (path i, j), the command for a scan job processing is input to the control unit 25 of the composite machine 20 (path h). Since the control unit 25 is aware that the printer 21 is active (path i), the control unit 25 will not transmit the command for the scan job processing to the scanner 22, but transmits the command to the printer driver 11 (path k). Since the printer 21 is active (path i), the control unit 25 is connected to the printer driver 11 of the host PC 10 (path j), so therefore the command can be transmitted to the printer driver 11 (path k).

Next, the printer driver 11 recognizes the received command, and notifies the scanner-related data contained in the command to the scanner driver 12 (path m). The scanner driver 12 transmits the command to the control unit 25 of the composite machine 20 after the operation of the active printer 21 is either terminated or suspended (path n). The transmitted command is further transferred from the control unit 25 to the scanner 22 (path o). Thus, the scan job processing is executed by the scanner 22, and the data being scanned by the scanner 22 is acquired by the host PC 10 via the control unit 25 (path n, o).

The command being input to the composite machine 20 can be transmitted to either the printer driver 11 or the scanner driver 12. In other words, the command can be transmitted to either the printer driver 11 or the scanner driver 12, whichever is connected to the composite machine 20. The driver having received the command can check the data accompanying the command and notify the same to the other driver.

Figure 6:
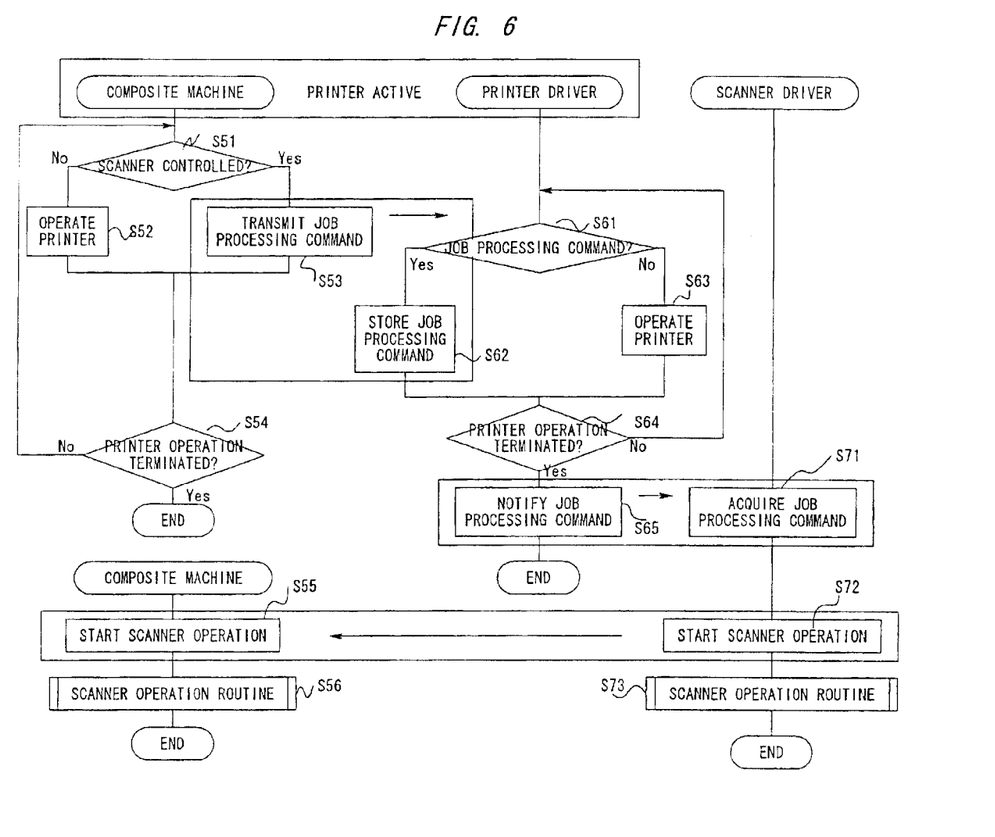
FIG. 6 is an explanatory view showing the process flow according to which a command for a scan job processing is input to the composite device while the printer of the composite device is active.

The above job processing is further explained with reference to the flowchart of FIG. 6. The flowchart of FIG. 6 refers to an example where a command for a scan job processing to be executed by the scanner 22 is input to the composite machine 20 while the printer 21 of the composite machine 20 is active.

The control unit 25 of the composite machine 20 monitors whether a command for a scan job processing by the scanner 22 is input through the operating unit 24 of the composite machine 20 while the printer 21 is active (step S51), and if there is no input of a command for a scan job processing by the scanner 22, the operation of the printer 21 is continued (step S52). Then, whether the operation of the printer 21 is completed or not is determined (step S54), and if it is determined that the operation of the printer 21 is not completed, the procedure returns to step S51. When it is determined in step S54 that the operation of the printer 21 is completed, the operation of the printer is terminated.

In contrast, when there exists a demand for controlling the scanner 22 in step S51, the control unit 25 transmits the command for the scan job processing to the printer driver 11 (step S53), before the procedure advances to step S54 where the termination of the printer operation is monitored.

The printer driver 11 having received the command for the scan job processing in step S53 determines whether it has received a command for a scan job processing by the scanner 22 (step S61). When it is determined in step S61 that the printer driver 11 has received the command for a scan job processing, the command is stored (step S62), and the printer operation is monitored to determine whether the operation has been terminated (step S64). On the other hand, if it is determined in step S61 that no command for a scan job processing is received, the operation of the printer 21 is continued (step S63), and the printer operation is monitored to determine whether the operation has been terminated (step S64).

In step S64, it is determined whether the operation of the printer 21 is terminated or not, and if not, the procedure returns to step S61. When it is determined that the operation of printer 21 is terminated, and if there exists a command for a scan job processing stored in step S62, the command is transmitted to the scanner 22 (step S65) before the print processing is terminated.

Upon acquiring in step S71 the command for a scan job processing from the printer driver 21 of the composite machine 20 in step S65, the scanner driver 12 of the host PC 10 starts operation of the scanner 22 (step S72), and based on the job processing command, the scanner 22 is activated to execute the scan operation (step S73). At this time, similar to steps S72 and S73, the scanner 22 of the composite machine 20 activates in steps S55 and S56.

Figure 7:
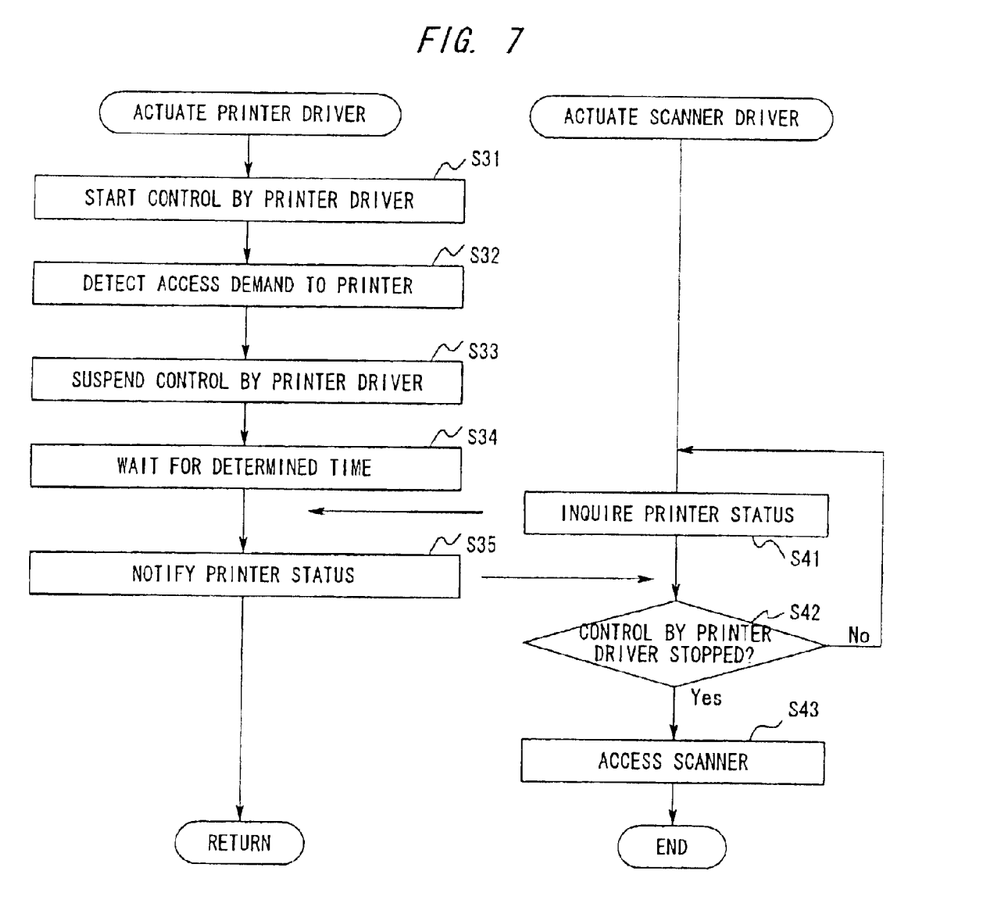
FIG. 7 is an explanatory view showing the process flow according to which access between host PC and composite device is demanded while the composite device is active.

Next, FIG. 7 is referred to in explaining an example according to which access between the host PC 10 and composite machine 20 (here in after described as between host PC—composite machine) is demanded while the composite machine 20 is activated. The flowchart of FIG. 7 illustrates the case where an access between host PC—composite machine is demanded while the printer 21 of the composite machine 20 is activated.

At first, the printer driver 11 and the scanner driver 12 are actuated. Then, the control of printer 21 is started by the printer driver 11 (step S31). Even during printer control, whether or not a demand for activating the printer 21 or the scanner 22 exists is detected (step S32).

The control of printer 21 performed by the printer driver 11 is temporarily stopped when it reaches a predetermined breakpoint (step S33), even if the job processing performed by the printer 21 is not completely finished. Next, the control of the printer 21 is stopped for a predetermined period of time, and the printer driver 11 enters a standby state (step S34).

On the other hand, the scanner driver 12 inquires the status of the printer 21 to the printer driver 11 (step S41). Upon receiving the inquiry, the printer driver 11 notifies the status of the printer 21, that is, whether the printer driver 11 is at a standby state or not, to the scanner driver 12 (step S35). The printer driver 11 repeats steps S31 through S35 so as to continue job processing.

In step S42, whether the control by the printer driver 11 is stopped or not is monitored by the scanner driver 12 based on the notice output from the printer driver 11 in step S35, and when it is determined that the printer 21 is activated, the procedure returns to step S41. On the other hand, when it is determined in step S42 that the printer driver 11 is at a standby state and the printer 21 is stopped, the access to the printer 21 or the scanner 22 is executed based on the demand for access between host PC—composite machine (step S43).

The above examples are explained assuming that the composite machine 20 comprises a printer 21 and a scanner 22, but the present invention is not limited to such example. The composite machine 20 can be equipped with other devices having various functions such as facsimile and digital camera, or the machine 20 can be equipped with two or more devices.

Moreover, the job processing performed by the composite device system 1 is not restricted to the above described example, and various changes and modifications can be made without departing from the scope of the invention as defined in the appended claims.

As explained, according to the present composite device system comprising a host that is connected to the composite device including plural devices for controlling the composite device, the host comprises a plurality of drive units each corresponding to one device included in the composite device for controlling the device, the drive unit recognizing the status of other devices controlled by other drive units via said other drive units, and an arbitrary drive unit out of the plurality of drive units recognizes the status of the device being controlled by other drive units via said other drive units. In other words, according to the present invention, the status of each device contained in the composite device is recognized by the communication between drive units within the host, so there is no need to establish a communication path (neither physically nor logically) connecting each drive unit of the host and each device of the composite device. The host is capable of recognizing the statuses of various devices composing the composite device with only one communication path connecting the host and the composite device. As a result, the host is capable of controlling the composite device with only a single communication path connecting the host and the composite device.

Even if plural job processes are demanded to a single device within the composite device, the host is capable of recognizing the status of each device constituting the composite device and controlling the composite device. Thus, the composite device is not required to control each device even when competition of accesses exists. Therefore, resources such as ASIC and ROM utilized for controlling each device constituting the composite device becomes unnecessary, and the cost of the composite device can be cut down.

Furthermore, there is no need to provide to the composite device a common module to be accessed from the plural drive units within the host. Thus, the composite device can call the kernel driver (drive unit) of the host OS directly. As a result, the steps involved in manufacturing the composite device system is reduced, and the manufactured composite device system becomes very stable.

Moreover, the present composite device system characterizes in that a command being input is notified from one drive unit to other drive units, and at the same time, the status of the device demanded of operation by the command is recognized. Therefore, the present invention is capable of transmitting the demand of the command being input to the appropriate drive unit. In other words, even if the command is input to a drive unit that is not capable of executing the demand contained in the command, the drive unit can transmit the command to a drive unit that is capable of executing the demand. Thus, the demand contained in the command is executed reliably.

Even further, if the command is input to the composite device, the command can be transmitted from the composite device to an arbitrary drive unit in the host, and the command can further be transmitted from the arbitrary drive unit to other drive units. Thus, the input command can be transmitted to the appropriate drive unit without fail via a single communication path connecting the host and the composite device.

According to the present composite device system, the recognition by the drive unit of the status of other devices is performed at every predetermined time, and the control of another device by another drive unit is performed at predetermined time intervals during which time the control of other devices is suspended. The drive unit recognizes that the control of devices by other drive units is stopped before communicating with the composite device, and the other drive units stop the control of devices at a predetermined time interval. Therefore, even if communication between a drive unit and the composite device is demanded during the period in which one drive unit is controlling the device, the communication between the drive unit and the composite device can be performed when the control by the other device is suspended temporarily. Thus, the demanded communication between the drive unit and the composite device can be realized without fail during operation of the composite device.

Moreover, since the operation of the composite device is temporarily suspended, the drive unit can communicate with the desired device directly. There is no need to communicate data between the drive units within the host, so the control of the composite device system can be simplified.

According to the present composite device system, the period of time in which the control of other devices by other drive units is suspended is longer than the interval of the drive unit recognizing the status of said other devices, so the drive unit can confirm infallibly that the control of the device by other drive units is suspended during that suspended period. Therefore, even when a demand for communication between the drive unit and the composite device is input during the operation of the composite device, the communication between the drive unit and the composite device can be established without fail.

As explained, the present invention provides an improved composite device system capable of avoiding competition of accesses by various devices without causing increase of related costs.

What is claimed is:

1. A composite device system comprising:
   a host connected to a composite device including plural devices, said host controlling said composite device;
   said host comprising a plurality of drive units that correspond to each device included in said composite device, said each drive unit controlling one of said devices, respectively; and
   wherein each drive unit is capable of recognizing via said other drive unit(s) a status of other of the device(s) that are controlled by other of the drive unit(s).

2. A composite device system comprising:

a host connected to a composite device including plural devices, said host controlling said composite device;

said host comprising a plurality of drive units that correspond to each device included in said composite device, said each drive unit controlling one of said devices, respectively;

each drive unit capable of recognizing via said other drive unit(s) a status of other of the device(s) that are controlled by other of the drive unit(s); and wherein said each drive unit informs the other drive unit(s) of a command being input thereto, and recognizes the status of a device whose operation is demanded by said command.

3. A composite device system comprising:

a host connected to a composite device including plural devices, said host controlling said composite device;

said host comprising a plurality of drive units that correspond to each device included in said composite device, said each drive unit controlling one of said devices, respectively;

each drive unit capable of recognizing via said other drive unit(s) a status of other of the device(s) that are controlled by other of the drive unit(s); and wherein said drive unit recognizes the status of other device(s) at every predetermined time; the control of other device(s) by other corresponding drive unit(s) performed at predetermined time intervals while the control of other device(s) are stopped; and said drive unit confirms that the control of device(s) by other drive unit(s) is stopped before communicating with said composite device.

4. A composite device system according to claim 3, wherein the period of time during which the control of other device(s) by said other drive unit(s) is stopped is longer than said interval for said drive unit to recognize the status of other device(s) at every predetermined time.

5. A composite device system comprising a host connected to a composite device including at least first and second devices, said host controlling said composite device;

said host comprising at least first and second drive units that respectively drive the first and second devices in said composite device;

each of the first and second drive units capable of recognizing via the other of said first and second drive units a status of the device corresponding to the other of the first and second drive units; and wherein each of said first and second drive units informs the other of the first and second drive units an indication of a command input thereto, and recognizes a status of at least one of the devices.

* * * * *